United States Patent [19]
Weng

[11] Patent Number: 5,501,116
[45] Date of Patent: Mar. 26, 1996

[54] TRANSMISSION DEVICE FOR A VERTICAL BLIND

[76] Inventor: Ming L. Weng, P.O. Box 82-144, Taipei, Taiwan

[21] Appl. No.: 204,097

[22] Filed: Mar. 2, 1994

[51] Int. Cl.⁶ .................. E06B 9/38; F16H 1/16
[52] U.S. Cl. .................. 74/89.14; 74/425; 160/174
[58] Field of Search .................. 74/89.14, 425; 160/174 V, 177 V

[56] References Cited

U.S. PATENT DOCUMENTS

| | | | |
|---|---|---|---|
| 2,223,997 | 12/1940 | Lorentzen | 74/425 |
| 3,398,590 | 8/1968 | Campbell et al. | 74/89.14 |
| 3,722,311 | 3/1973 | Northrup | 74/425 |
| 4,306,608 | 12/1981 | Frentzel et al. | 160/176 RX |
| 4,967,823 | 11/1990 | Gagnon | 160/177 V |

Primary Examiner—Rodney H. Bonck
Assistant Examiner—Troy E. Grabow
Attorney, Agent, or Firm—Alfred Lei

[57] ABSTRACT

A transmission device for a vertical blind including a housing, a worm disposed within the housing and having an upper flange, a lower flange, and at least two spiral teeth between the upper flange and the lower flange, each of the spiral teeth having an end gradually extending outwardly from the worm, and a worm gear disposed within the housing and meshed with the worm, the worm gear being formed with a partition across a number of teeth thereof.

1 Claim, 4 Drawing Sheets

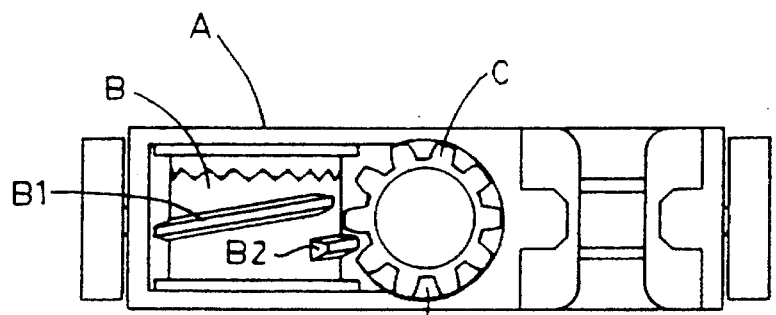
PRIOR ART
FIG. 1A
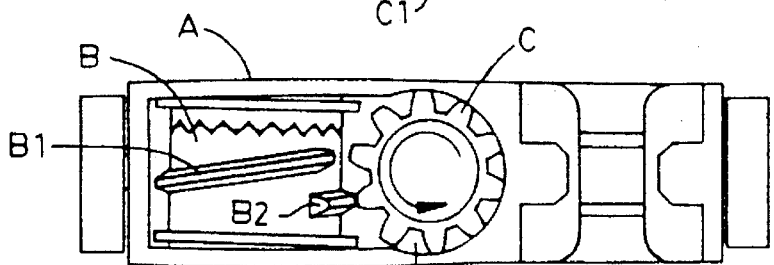
PRIOR ART
FIG. 1B
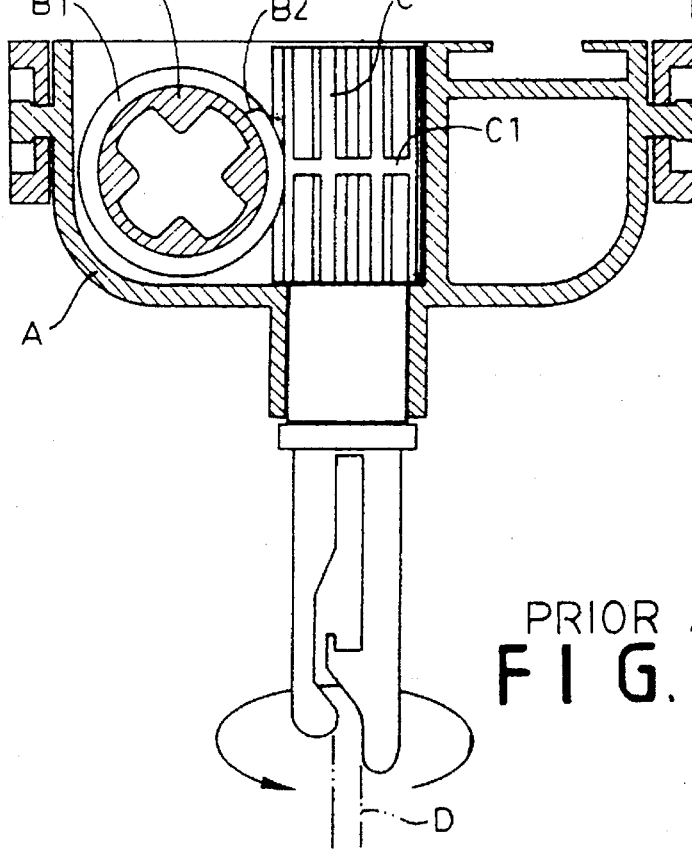
PRIOR ART
FIG. 1C

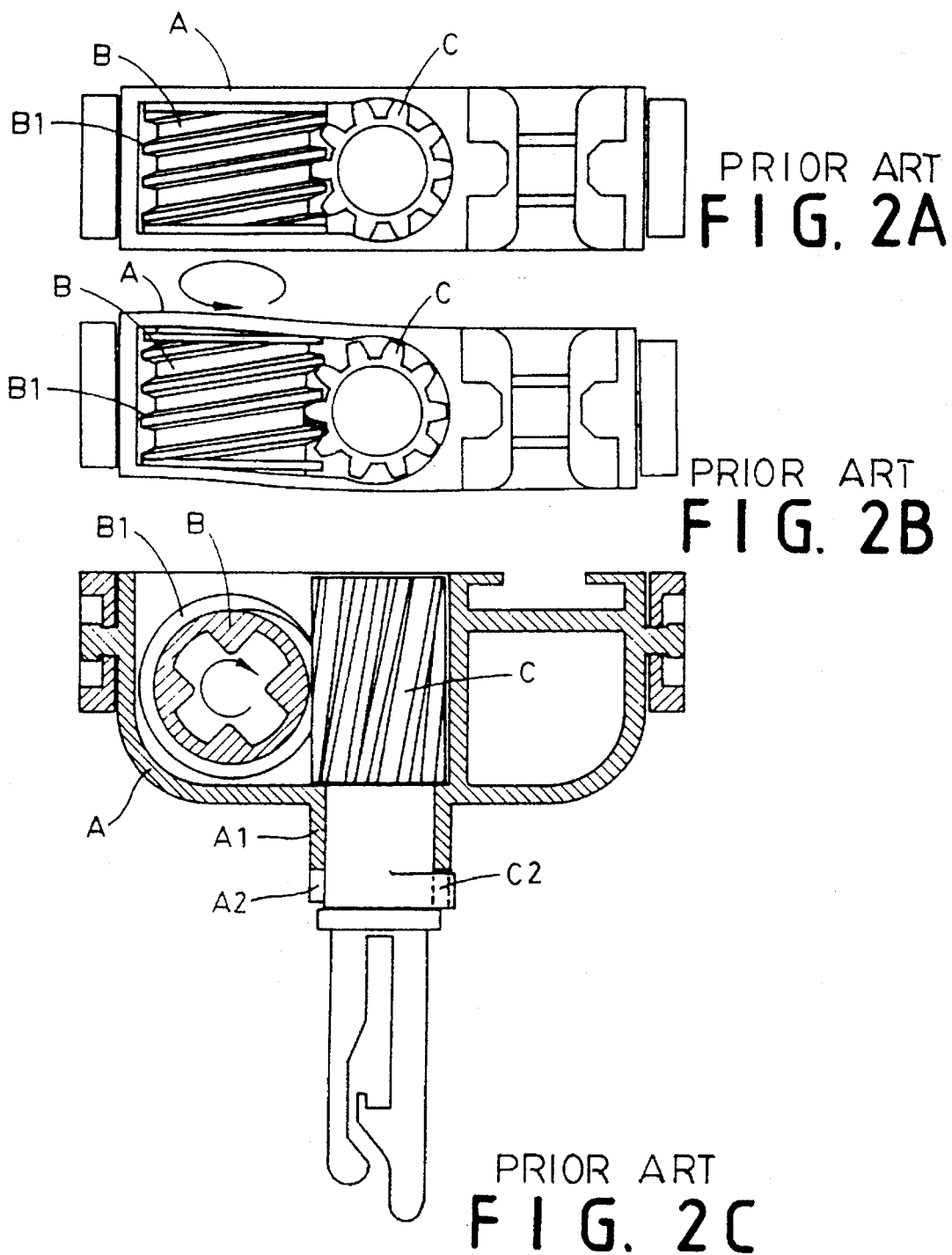
PRIOR ART
FIG. 2A
PRIOR ART
FIG. 2B
PRIOR ART
FIG. 2C

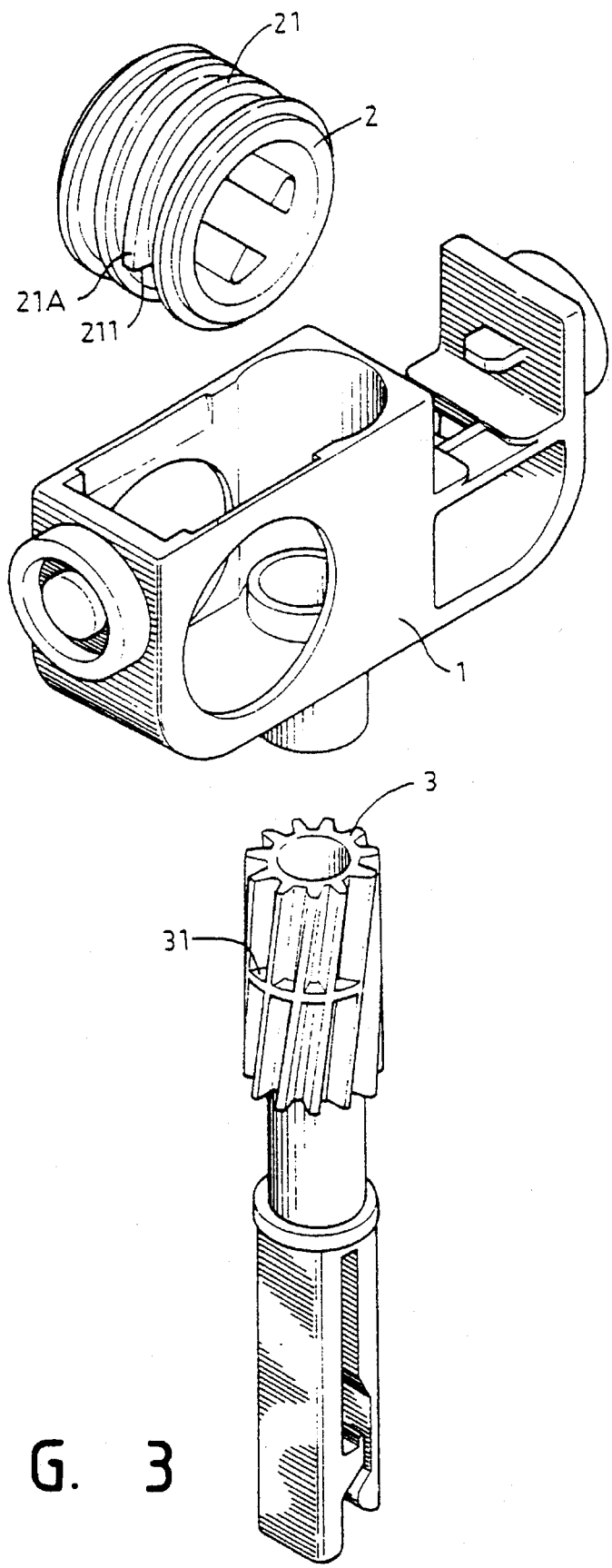
FIG. 3

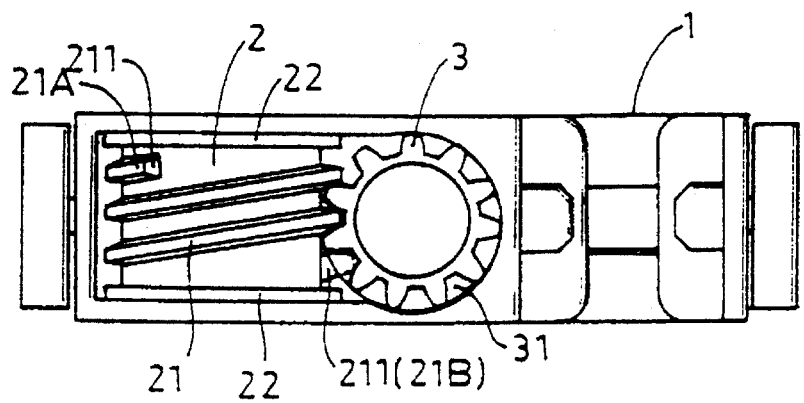
F I G. 4
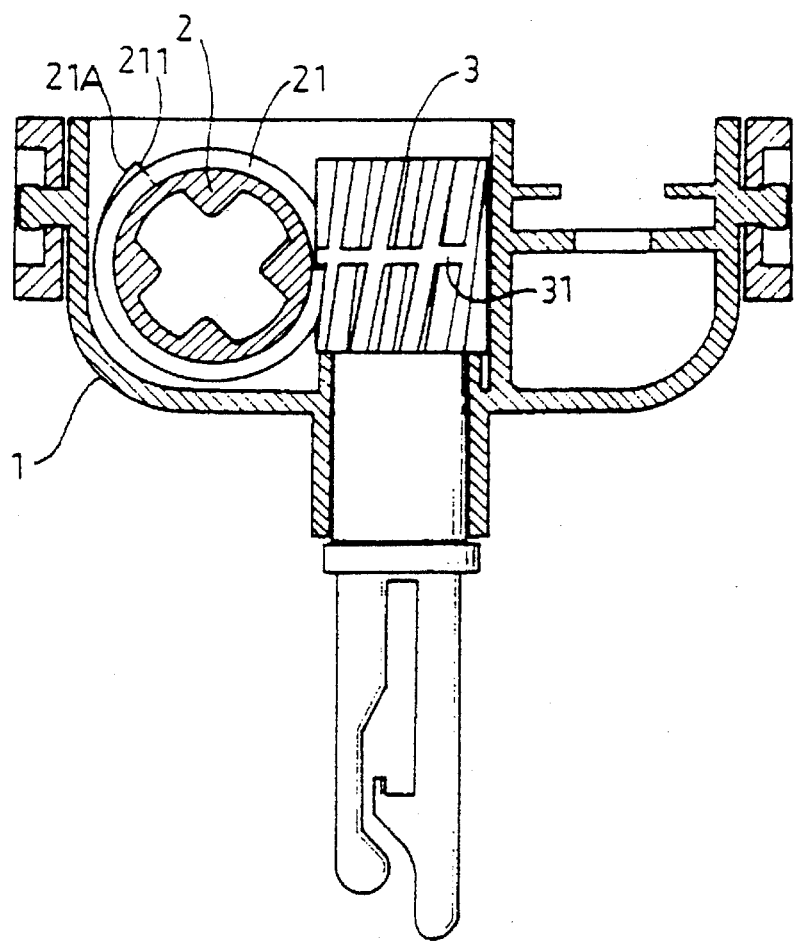
F I G. 5

TRANSMISSION DEVICE FOR A VERTICAL BLIND

BACKGROUND OF THE INVENTION

FIGS. 1A, 1B and 1C show a prior art transmission device for a vertical blind. As illustrated, the transmission device includes a housing A in which are fitted a worm B and a worm gear C. The worm B is provided with a single tooth B1 adapted to engage the worm gear C. Further, the worm gear C has a partition C1 for engaging the end of the tooth B1 of the worm B so as to limit the worm gear C to rotate through a maximum angle of 180 degrees only. However, as a twisting force is exerted on the vane D, the worm gear C will be urged to skip onto the tooth of the worm B.

Hence, another prior art transmission device (see FIGS. 2A, 2B and 2C) for a vertical blind has been developed to obviate this drawback. As can be seen, the worm B is provided with a plurality of teeth B1 so that at least two teeth B1 of the worm B will be engaged with the worm gear C simultaneously. In addition, the housing A is formed with a neck portion A1 having a notch A2 for engaging a protuberance C2 of the worm gear C thereby limiting the worm gear C to rotate through a maximum angle of 180 degrees. Nevertheless, it is not easy to feel that the protuberance C2 of the worm gear C has been blocked by the notch A2 of the housing thereby often excessively rotating the worm B and therefore breaking the housing A.

Therefore, it is an object of the present invention to provide an improved transmission device for a vertical blind which can obviate and mitigate the above-mentioned drawbacks.

SUMMARY OF THE INVENTION

This invention relates to an improved transmission device for a vertical blind.

It is the primary object of the present invention to provide a transmission device for a vertical blind which works positively and smoothly.

It is another object of the present invention to provide a transmission device for a vertical blind which is simple in construction.

It is still another object of the present invention to provide a transmission device for a vertical blind which is easy to operate.

It is still another object of the present invention to provide a transmission device for a vertical blind which is facile to manufacture.

It is a further object of the present invention to provide a transmission device for a vertical blind which is fit for practical use.

Other objects and merits and a fuller understanding of the present invention will be obtained by those having ordinary skill in the art when the following detailed description of the preferred embodiment is read in conjunction with the accompanying drawings wherein like numerals refer to like or similar parts.

BRIEF DESCRIPTION OF THE DRAWINGS

FIGS. 1A, 1B and 1C show a prior art transmission device for a vertical blind;

FIGS. 2A, 2B and 2C show another prior art transmission device for a vertical blind;

FIG. 3 is an exploded view of a transmission device for a vertical blind according to the present invention;

FIG. 4 is a top view of the transmission device according to the present invention; and FIG. 5 is a sectional view of the transmission device according to the present invention.

DETAILED DESCRIPTION OF THE PREFERRED EMBODIMENT

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIGS. 3 to 5 the transmission device for a vertical blind according to the present invention mainly comprises a housing 1, a worm 2, and a worm gear 3. The structure may be of any conventional design well-known to those skilled in the art and is not considered a part of the invention. The worm 2 and the worm gear 3 are disposed within the housing 1 and engaged with each other.

Referring to FIGS. 4 and 5, the worm 2 is provided with an upper flange 22, a lower flange 22, and at least two spiral teeth 21 having an upper end 21A and a lower end 21B both with an end surface 211. Both the upper end 21A and the lower end 21B of the worm 2 gradually extend outwardly from the worm 2. The worm gear 3 is arranged within the housing 1 and meshed with the worm 2. Further, the worm gear 3 is formed with a partition 31 across a number of teeth of the worm gear 3 so that the worm gear 3 can be driven by the worm 2 to rotate through a maximum angle of 180 degrees only.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A transmission device for a vertical blind comprising:
  a worm disposed within a housing and having an upper flange, a lower flange, a spiral tooth extending at least 720 degrees around the worm and having a given radial dimension, the tooth positioned between the said upper flange and said lower flange; and
  a worm gear disposed with said housing and meshed with said worm, said worm gear being formed with a partition across a number of teeth thereof, said worm gear being limited to rotate through a maximum angle of 180 degrees only;
  characterized in that the spiral tooth has ends gradually extending radially outward beyond the said given radial dimension of the spiral tooth.

* * * * *